A. C. JOHNSON.
TRACTOR.
APPLICATION FILED AUG. 26, 1916.
1,299,351.  Patented Apr. 1, 1919.
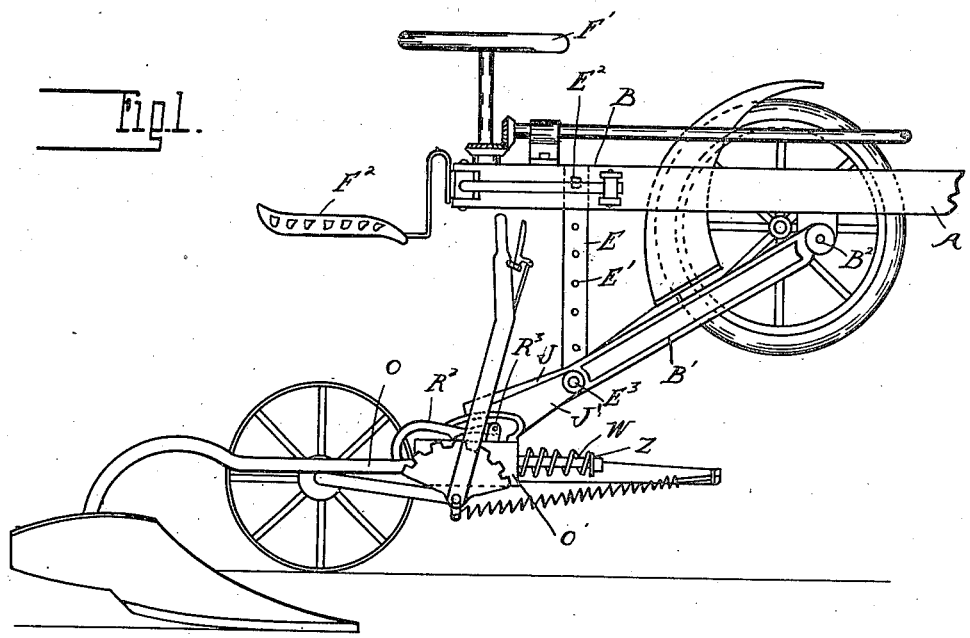
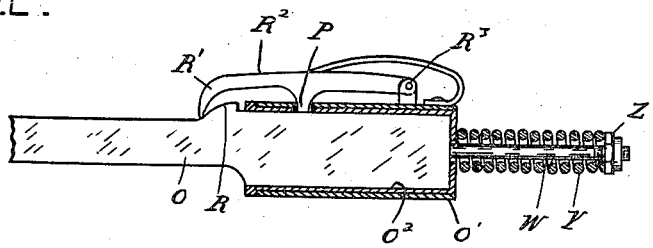
Inventor
Alfred C. Johnson
By Whittemore Hulbert Whittemore
Attorneys

UNITED STATES PATENT OFFICE.

ALFRED C. JOHNSON, OF WINTERS, CALIFORNIA, ASSIGNOR TO YUBA MANUFACTURING COMPANY, OF SAN FRANCISCO, CALIFORNIA, A CORPORATION OF CALIFORNIA.

TRACTOR.

1,299,351.     Specification of Letters Patent.     Patented Apr. 1, 1919.

Original application filed February 2, 1914, Serial No. 816,034. Divided and this application filed August 26, 1916. Serial No. 117,086.

*To all whom it may concern:*

Be it known that I, ALFRED C. JOHNSON, a citizen of the United States of America, residing at Winters, in the county of Yolo and State of California, have invented certain new and useful Improvements in Tractors, of which the following is a specification, reference being had therein to the accompanying drawings.

This invention relates to tractors and refers more particularly to a tractor adapted to pull a plow or other farm implement, although the invention in its broader aspects is not limited to the particular use specified.

Among the objects of the invention are to provide improved means for securing the plow or other load to the tractor so that when there is an excessive pull through the connection the load will be automatically disconnected from the tractor; to provide a construction which can be employed interchangeably with various farm implements of standard construction and in general to provide a new and improved connecting device for tractors.

The invention also resides in such details of construction and arrangements and combinations of parts as will more fully hereinafter appear, this application being a divisional of my application, Serial No. 816,034, filed February 2, 1914.

In the drawings,

Figure 1 is a side elevation of the rear portion of a tractor showing a plow attached;

Fig. 2 is an enlarged cross section through the automatic release for the load.

In the construction shown in the drawings, the main frame A of the tractor has a rear portion B which is supported by a sub-frame B' secured at one end to the main frame by a pivotal connection B². The sub-frame extends diagonally downward from the main frame and has its lower end adjustably spaced therefrom by a bar E. A plurality of apertures E' are provided in the spacer bar E, these apertures being engaged by bolts E² and E³ which pass through apertures in the main frame and sub-frame respectively. The rear end of the main frame is raised or lowered according to which apertures in the bar E are engaged by the bolts E² and E³.

A suitable steering wheel F' and seat F² are carried by the rear end B of the main frame, while at its lower end, the sub-frame B' is provided with a bearing portion J to which the frame of the plow or other implement may be attached. Provision is made in the following manner for guarding against injury to the tractor through excessive strains arising from the plow-shares striking stones, stumps, or the like. As shown in detail in Fig. 2, the plow-beam O has slidably sleeved upon its forward end an inner bearing member O². A bolt W secured to the forward end of the plow-beam projects through an aperture in the forward end of the bearing O² and a heavy spring Y is sleeved upon the bolt W and has its opposite ends bearing against the inner bearing member O² and an adjustable nut Z on the end of the bolt. This spring is sufficiently heavy to normally prevent any material relative movement between the plow-beam O and the inner bearing member O². This latter-mentioned member is adapted to extend within an outer bearing member O' carried by the frame J'. A lever R² is pivoted at R³ to the outer bearing member O' and carries a locking dog P extending through registering apertures in the bearings O' and O² normally locking the same from relative movement. When, however, the spring Y is placed under abnormal compression, it will permit sufficient relative movement between the beam O and the inner bearing O² to cause the cam surface R to raise the lever R² through the lug R' to release the dog P from the inner bearing member O². This will result in automatically releasing the plow or other member secured to the beam O and will prevent injury to the tractor.

The amount of pull necessary to compress the spring Y can be controlled by adjusting the nut Z either toward or from the bearing O'. Various farm implements may be provided with securing portions having the cam surfaces R and the inner bearing member O², so that they may be used interchangeably with the frame J'. Also other loads than farm implements can be employed as the invention contemplates the automatic releasing of any load from the tractor and the invention also resides in the use of any adjusting means for controlling the amount of pull necessary to automatically release the load from the tractor.

What I claim as my invention is:

1. The combination with a tractor frame having a hollow bearing, and a draft member to be secured thereto, of means for securing said members together comprising an inner bearing mounted upon the draft member and movable relative thereto in the direction of draft, a heavy spring interposed between the draft member and said inner bearing, resisting relative movement thereof in the direction of draft, the draft member having a cam surface, and a locking dog carried by the frame bearing adapted to engage said inner bearing and having a portion adapted to engage said cam surface and releasable thereby upon an abnormal pull on the draft member.

2. The combination with a tractor, of a draft member and an automatic releasing mechanism between said tractor and member including a casing, a locking member having a projection extending into locking engagement with said casing, and a draft member positioned in said casing yieldably held in relation thereto, and having a cam surface for lifting said locking projection upon a predetermined movement of said draft member relative to said casing.

3. The combination with a tractor and a draft member, the latter being provided with a cam surface, of a member mounted on the draft member and movable in the direction of draft, a spring yieldably resisting relative movement of the draft member, and said member mounted thereupon, and a pawl carried by the tractor engaging the movable member on the draft member to transmit draft to the latter, said pawl having a portion engageable with the cam surface of the draft member to release it from the member movable on the draft member when the draft member is subjected to an abnormal stress, and a consequent predetermined shifting thereof relative to the movable member carried thereby.

In testimony whereof I affix my signature.

ALFRED C. JOHNSON.